United States Patent
Lee et al.

(10) Patent No.: US 8,331,256 B2
(45) Date of Patent: Dec. 11, 2012

(54) METHOD OF MEASURING CELL IN WIRELESS COMMUNICATION SYSTEM

(75) Inventors: Seon Don Lee, Anyang-si (KR); Young Dae Lee, Anyang-si (KR); Sung Duck Chun, Anyang-si (KR); Seung June Yi, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 120 days.

(21) Appl. No.: 12/679,401

(22) PCT Filed: Oct. 24, 2008

(86) PCT No.: PCT/KR2008/006311
§ 371 (c)(1),
(2), (4) Date: Mar. 22, 2010

(87) PCT Pub. No.: WO2009/054702
PCT Pub. Date: Apr. 30, 2009

(65) Prior Publication Data
US 2010/0202307 A1    Aug. 12, 2010

Related U.S. Application Data

(60) Provisional application No. 60/982,432, filed on Oct. 25, 2007.

(30) Foreign Application Priority Data

Dec. 7, 2007   (KR) .................. 10-2007-0127015

(51) Int. Cl.
*H04J 1/16* (2006.01)
(52) U.S. Cl. ................. 370/252; 370/311; 455/574
(58) Field of Classification Search ........... 370/252, 370/311, 328, 329, 331, 332, 338; 455/435.1–435.3, 455/436, 439, 450–452.2, 574
See application file for complete search history.

(56) References Cited

U.S. PATENT DOCUMENTS

| | | |
|---|---|---|
| 2003/0139184 A1 | 7/2003 | Singh et al. |
| 2004/0082328 A1 | 4/2004 | Japenga et al. |
| 2005/0181801 A1 | 8/2005 | Funnell |
| 2008/0176565 A1* | 7/2008 | Eerolainen et al. ........... 455/436 |
| 2008/0268843 A1* | 10/2008 | Ore et al. .................. 455/435.3 |

* cited by examiner

*Primary Examiner* — Ricky Ngo
*Assistant Examiner* — Kan Yuen
(74) *Attorney, Agent, or Firm* — Lee, Hong, Degerman, Kang & Waimey

(57) ABSTRACT

A method includes receiving priority information on priority for different frequency or a Radio Access Technology (RAT), measuring a serving cell periodically, measuring different frequency or RAT with higher priority than the serving cell, and suspending the measurement of different frequency or RAT with the higher priority during a certain time period when a measurement result of the different frequency or RAT with higher priority is lower than a reference value.

6 Claims, 6 Drawing Sheets

METHOD OF MEASURING CELL IN WIRELESS COMMUNICATION SYSTEM

CROSS REFERENCE TO RELATED APPLICATIONS

This application is the National Stage filing under 35 U.S.C. §371 of International Application No. PCT/KR2008/006311, filed on Oct. 24, 2008, which claims the benefit of earlier filing date and right of priority to Korean Application No. 10-2007-0127015, filed on Dec. 7, 2007, and also claims the benefit of U.S. Provisional Application Ser. No. 60/982,432, filed on Oct. 25, 2007.

TECHNICAL FIELD

The present invention relates to wireless communications and, more particularly, to a method for measuring cell in a wireless communication system.

BACKGROUND ART

A 3GPP (3rd Generation Partnership Project) based on a WCDMA (Wideband Code Division Multiple Access) wireless access technique is being widely deployed all over the world. An HSDPA (High Speed Downlink Packet Access), which may be defined as a first evolution of the WCDMA, provides a wireless access technique with a competitive edge in the mid-term future to the 3GPP. However, as requirements and expectations of users and service providers are continuously increasing and development of competitive wireless access techniques is proceeding, a new technical evolution in the 3GPP is requested to ensure competitiveness in the future. The requirements include a reduction in costs per bit, an increase in service availability, the flexible use of frequency bands, a simple structure and an open interface, proper power consumption of user equipments, or the like.

In general, cell selection can be classified into an initial cell selection performed at an initial stage after power of a user equipment is turned on and a cell reselection performed for handover or neighbor cell measurement.

The reason for the user equipment to perform a cell reselection is to register itself to a network to receive a service from the network. If the strength or quality of signals between the user equipment and a serving cell is degraded due to the movement of the user equipment, the user equipment reselects a different cell to maintain transmission quality of data. There may be various types of criterion to perform cell selection, and different priorities may be applied to the cell selection according to systems.

In addition, for the cell selection and cell reselection, the user equipment measures signals for the serving cell and neighbor cells non-periodically/periodically. Measurement for unnecessary cells may increase power consumption of the user equipment.

DISCLOSURE OF INVENTION

Technical Problem

A method is sought for reducing power consumption of a user equipment.

A method is also sought for measuring a cell based on priority for inter-frequency or inter-RATs.

Technical Solution

In an aspect, a method for measuring a cell in a wireless communication system is provided. The method includes receiving information about priority for a frequency or a Radio Access Technology (RAT), measuring a serving cell periodically, measuring different frequency or RAT with higher priority than the serving cell, and if a measurement result of different frequency or RAT with the higher priority is lower than a reference value, suspending measurement of different frequency or RAT with the higher priority during a certain time period.

The measurement of different frequency or RAT with the higher priority may be suspended when the measurement result of different frequency or RAT with the higher priority is lower than the reference value and a measurement result of the serving cell is higher than a first threshold.

In another aspect, a user equipment includes a Radio Frequency (RF) unit for receiving a radio signal, and a processor coupled with the RF unit and configured to measure a serving cell periodically, measure different frequency or RAT with higher priority than the serving cell, and suspend measurement of different frequency or RAT with the higher priority during a certain time period according to the measurement result of different frequency or RAT with the higher priority.

Advantageous Effects

Priorities are set for frequencies and RATs, and the priorities can be adjusted according to situations. Accordingly, a user equipment does not need to perform measurements on an unnecessary cell to thereby reduce power consumption.

MODE FOR THE INVENTION

Figure 1:
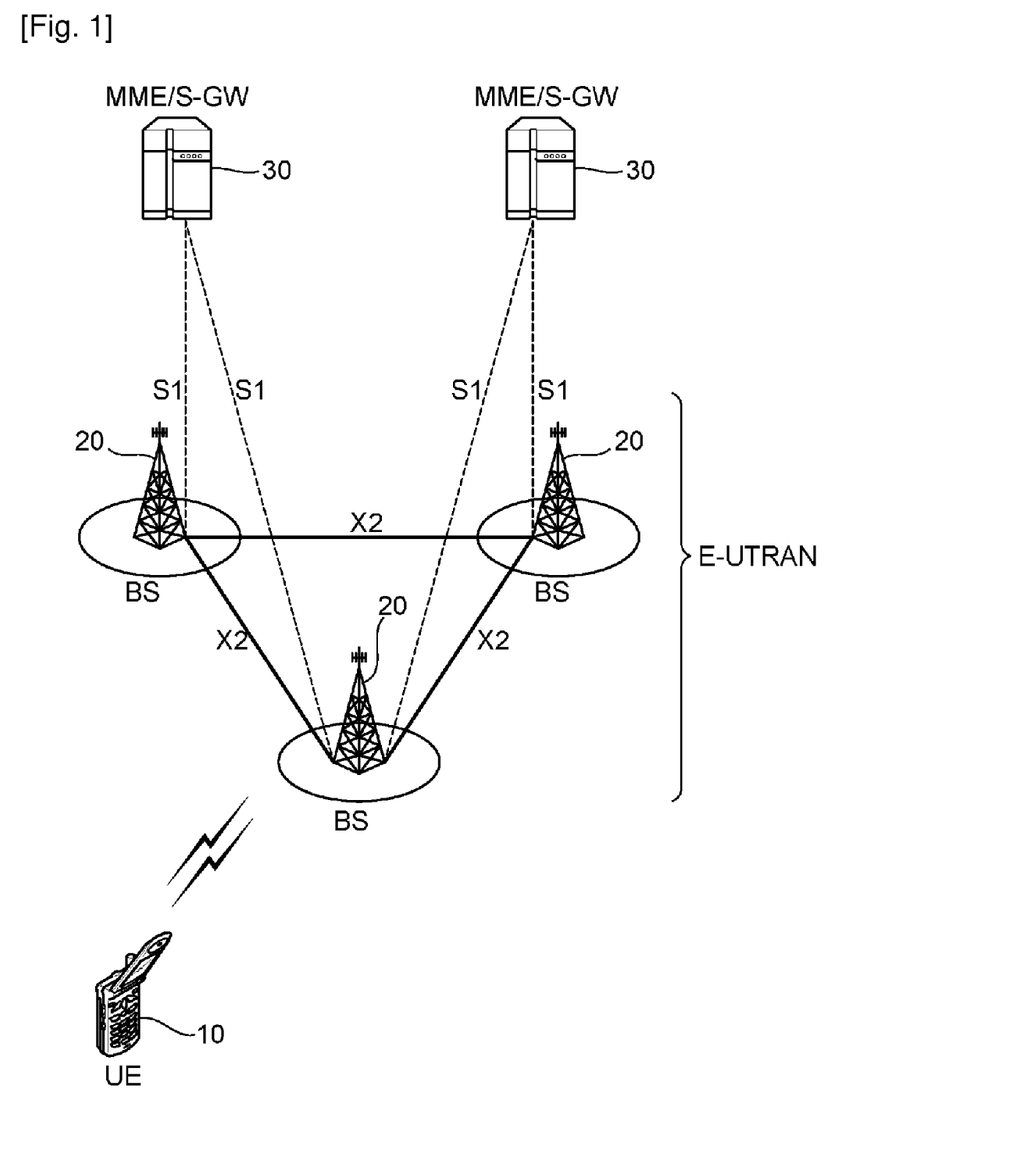
FIG. 1 is a schematic block diagram showing a wireless communication system.

FIG. 1 is a schematic block diagram showing a wireless communication system. It may be a network structure of an E-UMTS (Evolved-Universal Mobile Telecommunications System). The E-UMTS system may be an LTE (Long Term Evolution) system. The wireless communication system can be widely deployed to provide a variety of communication services, such as voices, packet data, etc.

Referring to FIG. 1, an E-UTRAN (Evolved-UMTS Terrestrial Radio Access Network) includes a base station (BS) 20 that provides a control plane and a user plane. A user equipment (UE) 10 may be fixed or have mobility, and may be referred to as another terminology, such as a mobile station (MS), a user terminal (UT), a subscriber station (SS), a wireless device, etc. The BS 20 generally refers to a fixed station that communicates with the UE 10 and may be called another terminology, such as an eNB (evolved-Node B), a BTS (Base Transceiver System), an access point, etc. There are one or more cells within the coverage of the BS 20. An interface may be used to transmit user traffic or control traffic between BSs 20. Hereinafter, downlink refers to communication from the BS 20 to the UE 10, and uplink refers to communication from the UE 10 to the BS 20.

The BSs 20 may be connected with each other via an X2 interface. The BS 20 is connected with an EPC (Evolved Packet Core), specifically, to an MME (Mobility Management Entity)/S-GW (Serving Gateway) 30, via an S1 interface. The S1 interface supports many-to-many relation between the BS 20 and the MME/S-GW 30.

Figure 2:
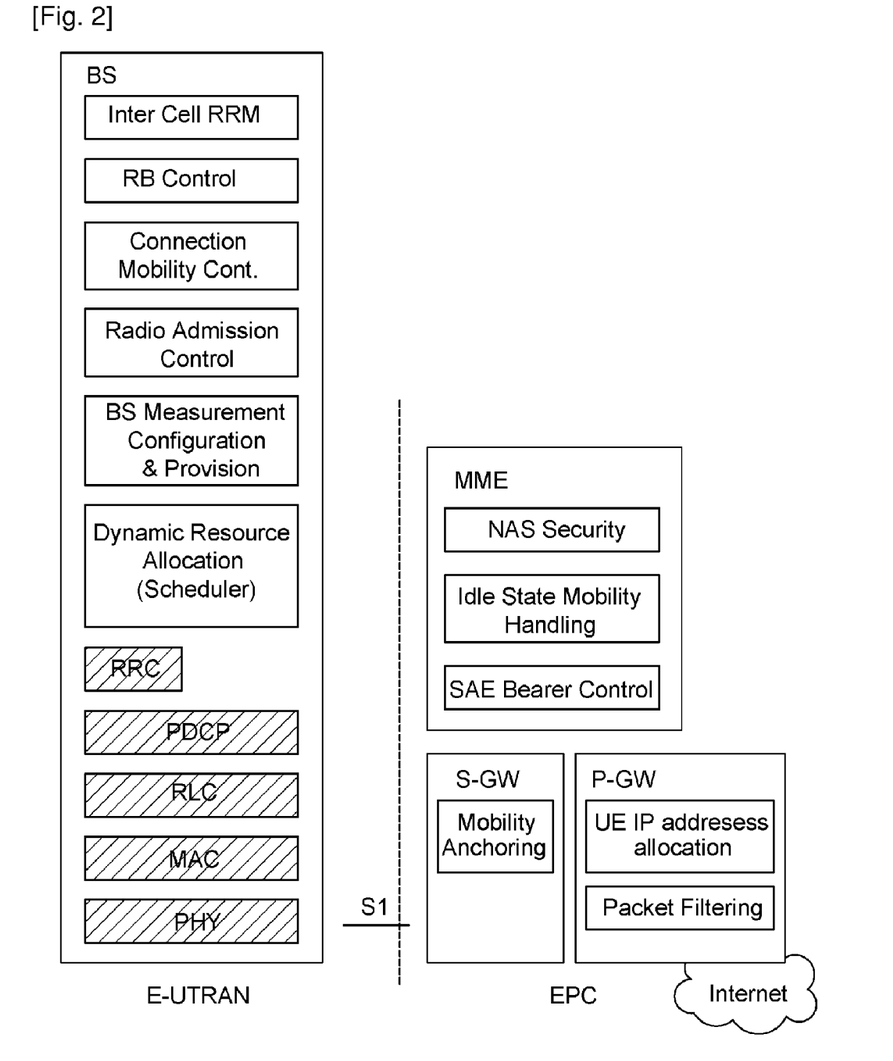
FIG. 2 is a block diagram showing functional split between the E-UTRAN and the EPC.

FIG. 2 is a block diagram showing functional split between the E-UTRAN and the EPC. Slashed boxes depict radio protocol layers and white boxes depict the functional entities of the control plane.

Referring to FIG. 2, a BS hosts the following functions: (1) radio resource management (RRM) function such as radio bearer (RB) control, radio admission control, connection mobility control, dynamic resource allocation to the UE; (2) IP (Internet Protocol) header compression and decryption of user data stream; (3) routing of user plane data to a serving gateway (S-GW); (4) scheduling and transmission of a paging message; (5) scheduling and transmission of broadcast information; and (6) measurement for mobility and scheduling and setting a measurement report.

An MME hosts the following functions: (1) distribution of paging messages to BSs; (2) security control; (3) idle state mobility control; (4) SAE bearer control; (5) ciphering and integrity protection of NAS (Non-Access Stratum) signaling.

The S-GW hosts the following functions: (1) termination of a user plane packet with respect to paging; and (2) user plane switching to support UE mobility.

Figure 3:
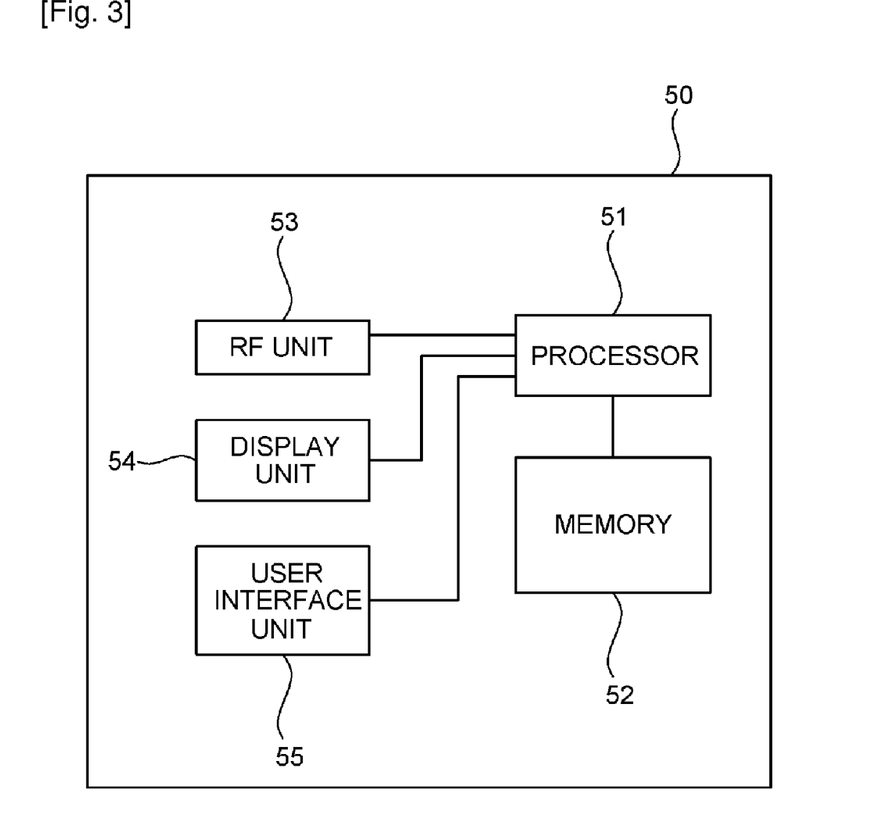
FIG. 3 is a schematic block diagram showing elements of a user equipment.

FIG. 3 is a schematic block diagram showing elements of the UE. A UE 50 includes a processor 51, a memory 52, an RF unit 53, a display unit 54, and a user interface unit 55. The processor 51 includes the layers of the radio interface protocol and provides the control plane and the user plane. Functions of the layers may be implemented via the processor 51. The memory 52 is coupled with the processor 51 and stores an operating system, an application and a general file. The display unit 54 displays various information of the UE and may use a well known element such as an LCD (Liquid Crystal Display), an OLED (Organic Light Emitting Diode), or the like. The user interface unit 55 may be configured by combining well known user interfaces such as a keypad, a touch screen, or the like. The RF unit 53 is coupled with the processor 51 and transmits and/or receives a radio signal.

The layers of the radio interface protocol between the UE and a network may be divided into a first layer L1, a second layer L2, and a third layer L3 based on the three lower layers of an open system interconnection (OSI) standard model widely known in communication systems. The physical layer belonging to the first layer (L1) provides an information transfer service using a physical channel, and an Radio Resource Control (RRC) layer belonging to the third layer serves to control radio resources between the UE and the network. To this end, the RRC layer exchanges an RRC message between the UE and the network.

Figure 4:
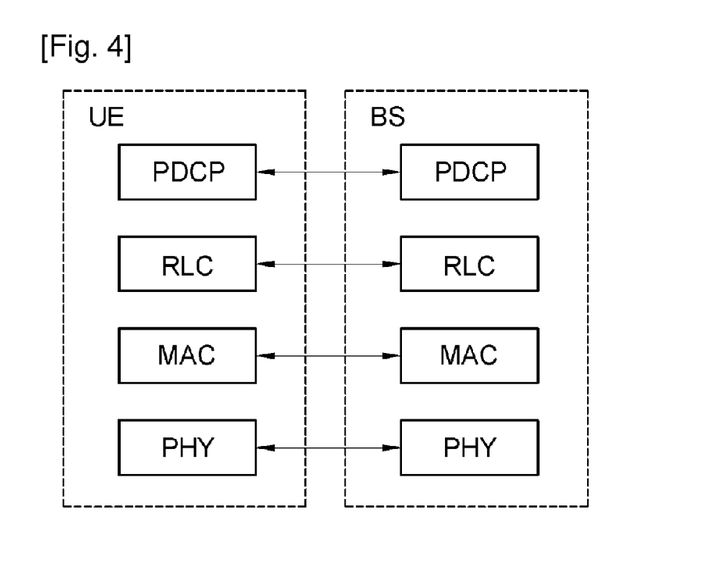
FIG. 4 is a schematic block diagram showing a user plane of a radio interface protocol.
Figure 5:
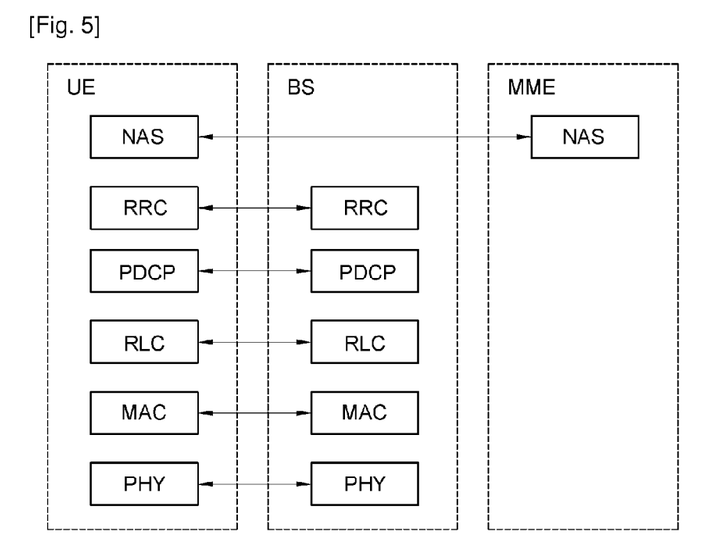
FIG. 5 is a schematic block diagram showing a control plane of the radio interface protocol.

FIG. 4 is a schematic block diagram showing the user plane of the radio interface protocol. FIG. 5 is a schematic block diagram showing the control plane of the radio interface protocol. It shows the structure of the radio interface protocol between the UE and the E-UTRAN. The user plane is a protocol stack for transmitting user data, and the control plane is a protocol stack for transmitting a control signal.

Referring to FIGS. 4 and 5, a physical (PHY) layer belonging to the first layer offers information transfer services to upper layers on a physical channel. The PHY layer is coupled with a MAC (Medium Access Control) layer, i.e., an upper layer of the PHY layer, through a transport channel. Data is transferred between the MAC layer and the PHY layer through the transport channel. Between different physical layers, i.e., the physical layer of a transmitter and the physical layer of a receiver, data are transferred through the physical channel. The physical channel may be modulated according to an Orthogonal Frequency Division Multiplexing (OFDM) scheme, and time and frequency may be utilized as radio resources.

The MAC layer in the second layer provides services to a RLC (Radio Link Control) layer, i.e., an upper layer of the MAC layer, through a logical channel. The RLC layer in the second layer supports reliable data transfer. There are three operating modes in the RLC layer, such as TM (Transparent Mode), UM (Unacknowledged Mode) and AM (Acknowledged Mode) according to a data transfer method. The AM RLC provides bidirectional data transmission services and supports re-transmission when the transfer of a RLC PDU (Protocol Data Unit) is failed.

A PDCP (Packet Data Convergence Protocol) belonging to the second layer performs a header compression function. The PDCP layer reduces the header size of the Internet Protocol (IP) packet so as to efficiently transmit the IP packet.

A RRC (Radio Resource Control) layer belonging to the third layer is defined only in the control plane. The RRC layer serves to control the logical channel, the transport channel, and the physical channel in association with configuration, reconfiguration and release of radio bearers (RBs). A RB means a service provided by the second layer for data transmission between the user equipment and the network. When a RRC connection is established between the RRC layer of the user equipment and the RRC layer of the network, it is called that the user equipment is in the RRC connected mode. When a RRC connection is not established yet, it is called that the user equipment is in the RRC idle mode.

A NAS (Non-Access Stratum) layer belonging to the upper layer of the RRC layer serves to perform session management and mobility management.

Downlink transport channels for transmitting data from the network to the UE includes a BCH (Broadcast Channel) for transmitting system information, a PCH (Paging Channel) for transmitting a paging message, a DL-SCH (Downlink-Shared Channel) for transmitting user traffic or a control message, or the like. Traffic or a control message of a downlink multicast or broadcast service may be transmitted via the DL-SCH or via a downlink MCH (Multicast Channel). Uplink transport channels for transmitting data from the UE to the network includes an RACH (Random Access Channel) for transmitting an initial control message and a UL-SCH (Uplink-Shared Channel) for transmitting user traffic or a control message.

The base station manages radio resources of one or more cells. A single cell is set with one of 1.25 MHz, 2.5 MHz, 5 MHz, 10 MHz, 20 MHz, etc., to provide a downlink or uplink transmission service to several UEs. In this case, different cells may be set to provide different bandwidth. Cells may be configured to overlap geographically by using several frequencies. The base station provides basic information for accessing a network to the UE by using system information. The system information includes essential information for the UE to know in order to be connected to the network. Thus, the UE should receive all the system information before being connected to the base station, and constantly maintains the latest system information. The system information is information all the UEs within a single cell should retain, so the base station periodically transmit the system information.

Logical channels mapped to a transport channel includes a BCCH (Broadcast Channel), a PCCH (Paging Control Channel), a CCCH (Common Control Channel), an MCCH (Multicast Control Channel), an MTCH (Multicast Traffic Channel), a DCCH (Dedicated Control Channel), or the like.

Figure 6:
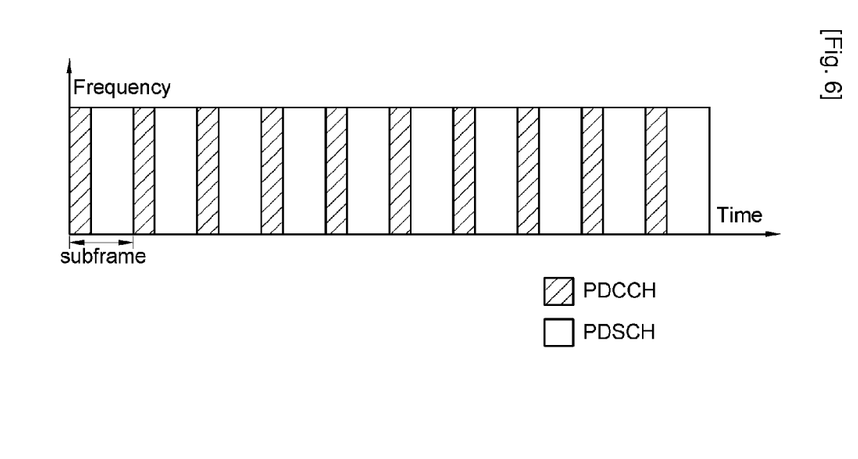
FIG. 6 shows a subframe structure.

FIG. 6 shows a sub-frame structure.

Referring to FIG. 6, a subframe includes a plurality of OFDM symbols and a plurality of subcarriers. The subframe is a unit for allocating radio resources. A single subframe includes a plurality of resource blocks, and a resource bock includes a plurality of subcarriers (e.g., twelve subcarriers). The subframe may be divided into a region to which a PDCCH (Physical Downlink Control Channel, which is also called an L1/L2 control channel) is allocated, and a region to which a PDSCH (Physical Downlink Shared Channel) is allocated. For example, three preceding OFDM symbols in the subframe may be allocated to the PDCCH. Time during which a subframe is transmitted is called a TTI (Transmission Time Interval), and 1 TTI may be, for example, 1 ms. A single subframe may be divided into two slots in a time domain, so when 1 TTI is 1 ms, one slot has a length of 0.5 ms.

A method for transmitting and receiving a paging message will now be described.

When a paging message including a paging record with a paging cause, a UE identity, or the like, is received, the UE performs a discontinuous reception (DRX) to minimize power consumption. Namely, the network configures several paging occasions at every period called a paging cycle, and the UE acquires a paging message only at the paging occasion. The UE may not receive such a paging message at other time than the paging occasion, and may be in a sleep state in order to reduce power consumption. A length of a single paging occasion may correspond to a single TTI. The network may indicate whether or not the paging message appears by using a paging indicator as a particular value informing a transmission of the paging message. An identifier such as a P-RNTI (Paging-Radio Network Temporary Identity) or the like may be defined as the paging indicator.

The UE wakes up at every DRX period to monitor the PDCCH in a subframe to know whether or not the paging message has been transmitted. When the UE detects the PDCCH addressed by the P-RNTI, it receives the paging message on a PDSCH indicated by the PDCCH. When the paging message includes a UE identifier (e.g., an IMSI (International Mobile Subscriber Identity)) of the UE, the UE can receive a service in response to the base station.

Figure 7:
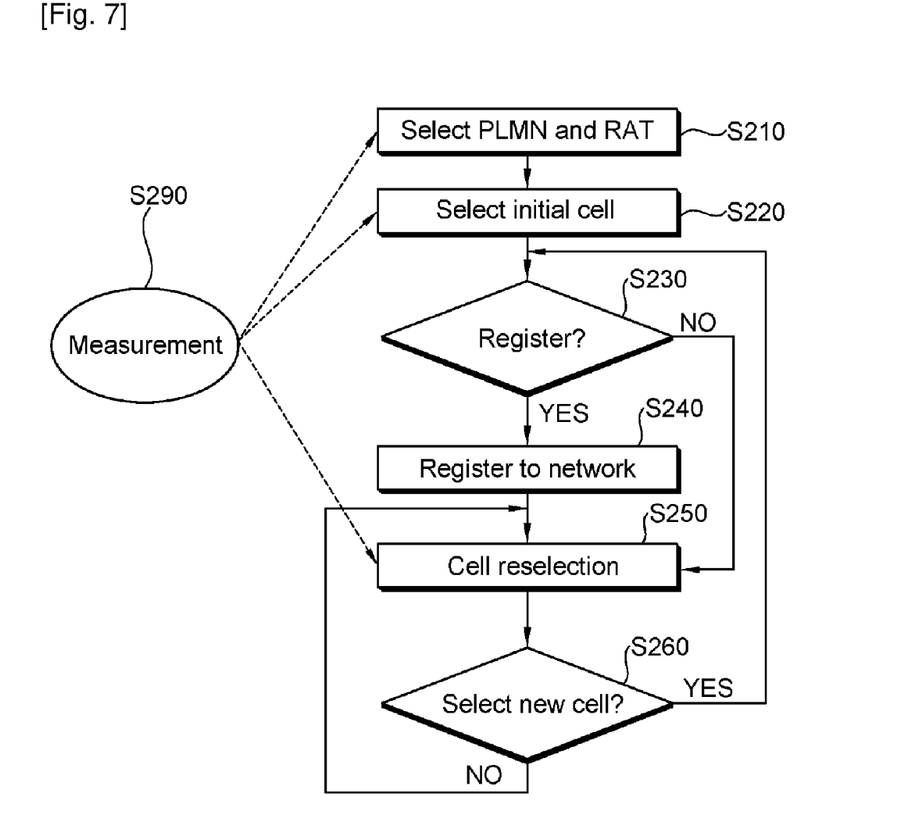
FIG. 7 is a flowchart illustrating the process of an operation of performing cell selection by a terminal in an idle mode.

FIG. 7 is a flowchart illustrating the process of an operation for performing cell selection by the UE in an idle mode. The purpose of performing cell selection by the UE is to register to the network to receive a service from the base station. When the strength or quality of a signal between the UE and a serving cell is degraded due to the movement of the UE, the UE reselects a different cell to maintain transmission quality of data. Hereinafter, a characteristic value of a physical signal related to the strength of a signal or an SINR (Signal-To-Interference plus Noise Ratio) or the like will be simply called a signal characteristics value. There may be a selection or reselection of a cell according to a signal characteristics value according to radio environments, and in performing the cell selection, the following methods may be performed according to an RAT (Radio Access Technology) of a cell and frequency characteristics.

(1) Intra-frequency cell reselection: reselection of a cell having the same RAT and the same center frequency as those of the cell in use by the UE, (2) Inter-frequency cell reselection: reselection of a cell having the same RAT as that of the cell in use by the UE and a different center frequency from that of the cell in use by the UE, (3) Inter-RAT cell reselection: reselection of a cell using a different RAT from that of the cell in use by the UE.

Referring to FIG. 7, in step S210, the UE selects a RAT to communicate with a PLMN (Public Land Mobile Network) from which the UE wants to receive a service. The PLMN and the RAT information may be selected by the user of the UE, or information stored in a USIM (Universal Subscriber Identity Module) may be used.

In step S220, the UE selects a cell having the best signal characteristics value as an initial cell according to a measured signal characteristics value, and then receives system information the selected cell periodically transmits.

In step S230, the UE determines whether or not registration has been made by comparing network information (e.g., a TAI (Tracking Area Identity)) received from the system information and network information that the UE has. If the network information received from the system information and the network information of its own are different, the UE performs a registration procedure to the network.

In step S240, the UE registers its information (e.g., its IMSI) to receive a service from the network.

In step S250, if a signal characteristics value measured from a neighbor cell is better than that measured from the serving cell from which the UE receives a service, the UE performs cell reselection. In this case, if priority of the inter-frequency or the inter-RAT has been defined, a cell may be selected in consideration of the priority. This is called a cell reselection, discriminated from an initial cell selection.

In step S260, when a new cell is selected, the UE determines again, starting from whether or not registration has been performed.

In step S290, the UE periodically or non-periodically performs measurement for the initial cell selection or cell reselection. An RSRP (Reference Symbol Received Power), an RSRQ (Reference Symbol Received Quality), an RSSI (Received Signal Strength Indicator), or the like, may be used as the measurement result.

In order for the UE to perform cell reselection according to the measurement result, cell reselection references such as a UE capability, subscriber information, cell load balancing, traffic load balancing or the like are required.

The cell reselection according to the UE capability refers to performing cell reselection according to a selectable frequency band because an available frequency band that can be used by the UE itself may be limited. The cell reselection according to the subscriber information refers to the fact that the UE may be set to be able to select or unable to select a cell according to subscriber information or an operator policy. The cell reselection according to the cell load balancing refers to allow a smaller number of UEs to select a cell in use in order to reduce a load by data generated when the UEs in an idle mode are activated in a single cell. The cell reselection according to the traffic load balancing refers to changing a cell in terms of reducing a load according to data generated from the activated UE.

The E-UTRAN system has a high possibility of extending and operating a frequency band in an existing UTRAN to facilitate installation/maintenance/repairing. Thus, in order to effectively use radio resources and balance an inter-cell load, it is much necessary to consider cell load balancing or traffic load balancing in a cell reselection.

In order to effectively perform a cell selection process, the UE may define priority for each frequency or each RAT to be considered in cell selection or cell reselection. This is called an inter-frequency priority or inter-RAT priority. In addition, if there are a plurality of frequencies/RATs, each of them may have a different priority or the same priority.

The reference for determining the inter-frequency/inter-RAT priority are based on various purposes as described below, and the below purposes require a process for selecting a cell by the UE.

(1) QoS (Quality of Service) to be provided for the UE: It refers to setting priority according to QoS or types of services to be provided to the UE. For an example, for a UE using only a VoIP (Voice over IP), a higher priority may be set for a particular frequency or RAT suitable for the VoIP. For another example, for a UE using a service requiring a high data rate, a higher priority may be set for the RAT (e.g., E-UTRAN) providing a high data rate. In addition, for a UE using an MBMS (Multimedia Broadcast Multicast Service), a higher priority may be set for a RAT or a frequency providing the MBMS.

(2) Network sharing: It refers to providing a service to a UE by sharing different PLMNs. In order to the UE to select a cell providing an available PLMN, a priority for a frequency or a RAT may be determined.

(3) Subscriber type: It refers to determining a priority according to subscriber information. For an example, for a user who has subscribed to only a voice communication service requiring a low speed, a higher priority may be set for a RAT (e.g., UTRAN) with a low speed, and a lower priority may be set for a RAT (e.g., E-UTRAN) with a high speed. For another example, for a user who has subscribed to a multimedia service requiring a high data rate, a higher priority may be set for the RAT (e.g., E-UTRAN) with a relatively high speed, and a lower priority may be set for the RAT (e.g., UTRAN) with a relatively low speed.

(4) CSG (Closed Subscriber Group) cell or home BS: A CSG cell refers to a cell that can be used by one or more particular users or UEs, and a high priority may be set for a frequency or a RAT to a particular UE that can access the CSG cell. A home base station installed in a place such as a home and used by the user may be one example of the CSG.

(5) Load balancing: Cell load balancing and traffic load balancing are included in load balancing. For example, a frequency or a RAT of a cell with a smaller load is set with a high priority to allow the UE to preferentially select the cell with the smaller load, thereby balancing inter-cell load. In addition, load balancing can be made by cell, TA (Tracking Area), RA (Registration Area, a set of a plurality of TAs), and PLMN according to a range of a region to which priority between frequencies and RATs is applied.

(6) Operator policy: A particular frequency or RAT may have a high priority according to a policy of an operator operating a network.

The validity and application range (scope) of the inter-frequency/inter-RAT priority information allocated to a UE may be as follows.

Validity of priority is determined by TA and the inter-frequency/inter-RAT priority is not changed before a TAU (Tracking Area Update) process. The TAU process refers to a process of registering identifier information such as an IMSI of the UE. When priority information is received from the network during or after the TAU process, the inter-frequency/inter-RAT priority is valid until the next TAU process.

Validity is determined in units of cells, and the inter-frequency/inter-RAT priority is not changed until before reselection of a different cell. For example, when priority information is received from the network during or after the cell reselection process, the inter-frequency/inter-RAT priority is valid until a next cell is reselected or until new priority information is received after a cell reselection.

Besides the TA unit or cell unit, validity or an application range such as a PLMN unit may be provided.

Validity or an application range such as an RPLMN (Registered PLMN) registered by the UE may be provided.

Priority may be invalidated due to a change in the state of the UE from an RRC idle mode to an RRC-connected mode. Priority may be invalidated according to a particular RRC message that the UE changes from the RRC idle mode to the RRC-connected mode. For example, the priority may be invalidated when the UE transmits an RRC connection request message, when an RRC connection setup message is received from the base station or when an RRC connection complete message is transmitted to the base station. Conversely, the priority may be invalidated due to a change in the state of the UE from the RRC-connected mode to the RRC idle mode. For example, the priority may be invalidated according to reception of an RRC connection release message.

The frequency and/or RAT information and the inter-frequency/inter-RAT priority information may be received from the base station as follows.

(1) The UE receives selectable frequency and/or RAT information from the base station in the process of TAU. The UE receives inter-frequency/inter-RAT priority in-formation as a part of system information.

(2) The UE receives inter-frequency/inter-RAT priority information as a part of system information.

(3) The UE receives selectable frequency and/or RAT information from the base station in the process of TAU. And the UE receives inter-frequency/inter-RAT priority information corresponding to each frequency and RAT.

(4) The inter-frequency/inter-RAT priority information may be received together with information about a frequency and/or a RAT through an RRC message. The RRC message may be at least one of an RRC connection release/connection request/connection setup message, a radio bearer setup message, a radio bearer reconfiguration message, an RRC connection reconfiguration message, an RRC connection re-establishment message.

(5) Frequency and/or RAT information are received via L1/L2 control signaling, and PDCP/RLC/MAC PDU. And inter-frequency/inter-RAT priority information of each frequency/RAT may be received.

Besides the method of receiving the frequency and/or RAT information from the base station and the method of receiving priority, frequency and or RAT information stored in an SIM/USIM card may be fetched, or priority information corresponding to each frequency and each RAT may be fetched.

The method for acquiring frequency and/or RAT information by the UE and the priority information acquiring method are not limited to one method but can be combined to be applied.

The UE may receive the inter-frequency/inter-RAT priority from the network according to at least one of the methods as mentioned above, and inter-frequency/inter-RAT priorities received according to different methods may be the same or different. If the UE repeatedly receives priority information according to different methods, the UE may preferentially apply a second priority rather than a first priority arbitrarily or according to a designated method. For example, when the UE receives the first priority information through system information and then receives the second priority information through the RRC connection release message, the UE may perform measurement and cell reselection according to the second priority information, disregarding the first priority information. Thereafter, the UE may be establish an RRC connection with the base station in order to be changed from an RRC idle mode to an RRC-connected mode to receive a service from the base station, and in this process, the UE may invalidate the second priority information that has been previously received from the RRC connection release message. If the UE fails to receive priority information from the network in RRC connection release, it may return to the RRC idle mode and perform cell reselection based on previous priority information or priority information received as a portion of the system information.

The UE may know the presence of each frequency or RAT from an NCL (Neighbor Cell List) received through the system information, and applies allocated priority with respect to the present frequency or RAT in cell reselection. Without the NCL, the UE may detect whether or not frequency or RAT exists through a process of searching a different frequency or RAT by the UE itself.

Figure 8:
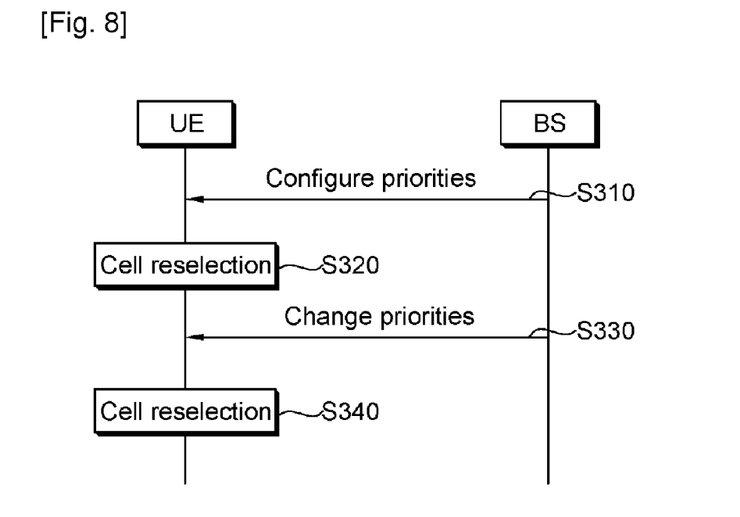
FIG. 8 is a flowchart of a cell reselection method according to an embodiment of the present invention.

FIG. 8 is a flowchart of a cell reselection method according to an embodiment of the present invention.

Referring to FIG. 8, in step S310, the base station transmits priority information for different frequencies or RATs to the UE, to configure priorities. In step S320, the UE performs cell reselection according to the priorities.

Figure 9:
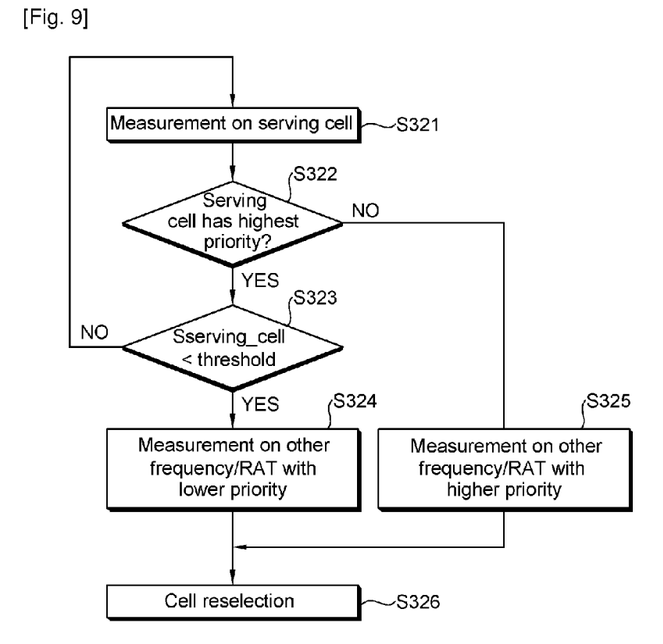
FIG. 9 is a flowchart illustrating the process of a cell measurement method using set priority.

FIG. 9 is a flowchart illustrating the process of a cell measurement method using set priority.

Referring to FIG. 9, in step S321, the UE measures a signal of the serving cell. In step S322, the UE determines whether the serving cell has the highest priority.

In step S323, if the serving cell has the highest priority, the UE checks whether or not a signal characteristics value ($S_{serving\_cell}$) satisfies particular conditions. The UE compares the signal characteristics value of the serving cell with a threshold value, and if the signal characteristics value satisfies the threshold value, the UE does not perform cell reselection but measure a signal of the serving cell after the lapse of a certain time. In step S324, if the signal characteristics value of the serving cell does not satisfy the particular conditions, the UE measures a signal of a cell of a frequency or RAT with a lower priority. In step S326, the UE performs cell reselection in consideration of the signal characteristics of the cell of the frequency or RAT with the lower priority.

In step S325, if the priority of the serving cell is not the highest or if there is a frequency or RAT with a priority higher than that of the serving cell, the UE measures a signal of the cell of the frequency or RAT with the higher priority. In step S326, the UE performs cell reselection in consideration of signal characteristics value of the frequency or RAT with the higher priority.

If the inter-frequency or the inter-RAT priority has been defined, the UE selects a cell corresponding to a frequency or RAT with high priority within a range that the minimum signal characteristics value defined by the system is satisfied. Exceptionally, the UE may select a cell with the highest signal characteristics value without consideration of priority defined in a frequency or RAT in an initial cell selection.

When the UE is receiving a service after selecting the highest frequency/RAT and signal characteristics value of the cell from which the UE receives the service, namely, the serving cell, is higher than the threshold value, the UE does not perform measurement on a frequency/RAT with lower priority, so power consumption according to otherwise measurement can be reduced. This means that if the signal characteristics of the serving cell are degraded to be lower than particular conditions, the UE selects a different cell with low priority that satisfies desired signal characteristics through the measurement process.

If there are several cells satisfying the signal characteristics values to be targets for cell reselection, the UE may select a cell by using one or more references such as a signal characteristics value, a priority, or the like, among a cell with the highest priority, a cell with the best signal characteristics, a cell with the highest priority and beyond a certain signal characteristics value, a cell with priority higher than a particular value and with the highest signal characteristics value.

If the UE does not receive a service from a cell of the frequency or RAT with the highest priority, namely, when the UE selects a cell of a frequency or RAT with a lower priority, the UE measures a frequency or RAT with a high priority periodically. In this case, the period for measuring the frequency or RAT with the high priority may be different from a period of measuring the serving cell. The period for measuring the frequency or RAT with the high priority may be a value previously determined between the base station and the UE and may be explicitly determined by one of the base station and the UE and informed to the other.

If the signal characteristics value of the cell as a target of the cell reselection satisfies particular conditions for a certain time period, cell reselection is performed. Also, if the signal characteristics value of the serving cell does not satisfy the particular conditions and the signal characteristics value of the cell as the target of the cell reselection satisfies the particular conditions for a certain time period, cell reselection is performed.

The UE has received priority information according to frequency or RAT from the base station but it fails to select a cell with the highest priority means that the signal characteristics value of the cell with the highest priority does not satisfy the particular conditions. This occurs frequently because of the mobility of the UE. In a state that the UE is receiving a service after selecting a cell with low priority and the signal characteristics value of the serving cell satisfies particular conditions, if the UE measures a signal with respect to a cell with high priority periodically/non-periodically, power of the UE would be wasted. For example, if the UE moves out of a coverage of the serving cell while receiving a service after being allocated the highest priority with respect to a frequency or RAT corresponding to a CSG cell (which is used only at home), that is, if the UE moves out of home, signal characteristics of the cell of the highest priority would weaken, so the UE would reselect other cell with low priority. The UE, which is receiving the service in the cell with low priority, would continuously perform measurement in order to select a cell of a frequency or RAT with high priority.

For another example, if the network allocates the highest priority to a first frequency and a lower priority to the second frequency for the purpose of load balancing, the UE would receive a service at the first frequency with the highest priority. However, if the signal characteristics value of the first frequency with the highest priority is lowered due to a movement of the UE, the UE would reselect the cell of the second frequency with lower priority. While receiving the service in the cell with the lower priority, the UE should continuously perform measurement to select the cell of the first frequency with the high priority.

For still another example, when the network allocates a frequency or RAT, at which an MBMS service is provided, with high priority, the UE requesting the MBMS service may preferentially selects the cell of the frequency or RAT providing the MBMS service to receive the service. However, if the signal characteristics value of the serving cell providing the MBMS is lowered due to mobility of the UE, the UE should select a cell of a frequency or RAT with low priority that does not provide the MBMS. In this case, in order to search a cell providing the MBMS, the UE should continuously measure a cell that provides the MBMS service, namely, a cell corresponding to the frequency or RAT with high priority.

Thus, it is noted that when the UE receives the service in a cell with low priority, it should measure a cell with high priority, which results in a waste of power due to the measurement of a cell.

Referring back to FIG. 8, in step S330, the base station transmits priority change information to the UE. In order to prevent power consumption of the UE due to measurement, the priority defined between the base station and the UE may be changed.

In step S340, the UE performs cell reselection by applying the changed priority.

The base station may transmit whether or not priority can be changed and/or the rule for changing priority to the UE. The UE changes the order of priority according to whether or not the priority can be changed and the priority change rule. In a different embodiment, priority may be changed according to a rule previously determined by the base station and the UE.

If there is an instruction that changing of priority is not possible from the base station, the UE does not change the order of priority.

Although the UE fails to receive explicit priority change information, it can change priority implicitly according to the predetermined rule. In addition, the UE is able to know the implicitly determined priority change rule according to a type of priority, namely, whether it is priority of a frequency or that of a RAT.

The types of priorities may be discriminated according to the purpose (e.g., load balancing, CSG cell, or the like) of the priority given to a frequency or RAT, and the UE may know the purpose of the priority through a method in which the UE is allocated priority from the base station. In addition, the base station may explicitly inform about the purpose of priority.

The base station may transmit the priority change information to the UE periodically or incidentally.

The UE may be explicitly instructed about priority change time point by the base station or the priority change time point may be incidental as follows:

(1) Time point at which signal characteristics are degraded like a time point when signal characteristics value of the serving cell drops to below a threshold value, (2) Time point at which signal characteristics of other cell are better, like a time point at which signal characteristics value at other cells than the serving cell is higher than a threshold value, (3) Time point at which the conditions (1) and (2) are met, (4) At least one of the conditions (1), (2), and (3) are maintained during a particular time, (5) Time point at which a particular RRC message (e.g., RRC connection reconfiguration failure message) is transmitted/received.

The change rule based on which the base station changes priority may be as follows.

(1) Assumption: It is assumed that priority of a cell selected by the UE is the highest. Namely, on the assumption that a priority of a cell selected by the UE is the highest, overriding a previous priority, measurement of a cell of another frequency or RAT may be omitted. Because the UE assumes that the cell selected by the UE itself has the highest priority among cells with low priorities, although the priority of the selected cell is low, if particular conditions are satisfied (e.g., signal characteristics value satisfies certain conditions), the UE does not measure a cell with higher priority. If the signal characteristics value of the selected cell does not satisfy certain conditions, the UE should measure a cell of different frequency or RAT according to priority or regardless of priority, and when the UE selects one of several cells available for cell reselection, it may select a cell that satisfies particular conditions. For example, the UE ma select a cell by using one or more references (basis) of a signal characteristics value, priority, or the like, such as a cell with the highest priority based on priorities allocated by the base station, a cell with the best signal characteristics value, a cell with signal characteristics value higher than a particular value and the highest priority, a cell with priority higher than a particular value and the highest signal characteristics value, or the like.

(2) Replacement: A priority allocated to a particular frequency or RAT is replaced with a priority of different frequency or RAT. For example, a priority (e.g., a second priority) of a serving cell is changed to different priority (e.g., a first priority), and in this case, two priorities may simultaneously exist.

(3) Exchange: Priorities for different frequencies or RATs are exchanged. Namely, it refers to interchanging between a priority (e.g., priority 1) of the serving cell and a particular priority (e.g., priority 2). In this case, priority of one frequency or RAT and priority of different frequency or RAT are interchanged.

(4) Reordering: Priorities allocated to different frequencies or RATs are reordered. In detail, a frequency or RAT selected by the UE may be set with a particular priority (e.g., the highest priority) according to a rule for reordering, and priorities may be assigned to remaining frequencies or RATs in the order starting from the highest priority or starting from the highest signal characteristics value. For example, it is assumed that there are three frequencies in the order starting from the highest priority and the respectively priorities are (frequency 1, 1), (frequency 2, 2), and (frequency 3, 3). If the UE selects a cell of the frequency with the priority 3, the priorities may be reordered like (frequency 3, 1), (frequency 1, 2), and (frequency 2, 3).

(5) Ignoring: It refers to ignoring priority. For example, if the UE determines that the frequency or RAT of its selected cell does not have priority, the UE may not search a cell with higher priority.

The above-described changing rules may not be limited to one, but can be combined to be applied.

The UE may change a pre-set priority according to the proposed priority changing rule. Thus, although the UE does not select a cell with the highest priority but select a cell with lower priority, it does not need to measure a cell with previous high priority through the priority change, and thus, a waste of power can be prevented.

After changing priority, the UE may return to the priority before the priority change according to a request from the network or determination of the UE. The network may transmit revert instruction information indicating reverting to the priority before the priority change, to the UE. Upon receiving the revert information from the network, the UE reverts the priority order to the order before the priority order change.

In a different embodiment, although the UE fails to receive the revert instruction information from the network, it may revert the priority order according to a particular event. The particular event may occur according to expiry of a revert timer. The revert timer performs a function of reverting priority to its original state.

A time point at which the UE drives the revert timer may be a time point at which the UE changes priority according to a priority change rule, a time point at which the revert timer is received, or a time point at which the UE explicitly receives an instruction of driving the revert timer from the network.

An expiry time of the revert timer may be determined implicitly between the base station and the UE, and may be determined by one of the network and the UE and informed to the other.

The instruction information of reverting the priority order to its original state provided by the network to the UE may be generated by an event according to a counter value. Performing the function of reverting priority to its original state, the counter is called a revert counter. The UE may increase or decrease the value of the revert counter explicitly or according to an incidental event as follows:

(1) When a signal characteristics value of the serving cell becomes lower than certain conditions,
(2) At a time point when the revert timer expires,
(3) When both the conditions (1) and (2) are met,
(4) When one of the conditions (1), (2), and (3) is maintained for a particular time period,
(5) When the signal characteristics of the serving cell goes up above a certain level,
(6) When the conditions (5) are maintained for a particular time period,
(7) When a particular RRC message (e.g., RRC connection reconfiguration failure message) is transmitted or received.

The UE may increase an initial value of the revert counter to a particular value (e.g., 1) according to one of the events. In the opposite case (e.g., when the signal characteristics value of the serving cell becomes higher than the certain conditions) among the events, the UE may decrease the particular value (e.g., 1). Also, the opposed operations may be possibly performed according to definition.

For example, if the signal characteristics value of the serving cell is lower than '−100 dB' when the initial value of the revert counter is '0', the UE may increase the value of the revert counter by '1', and if the signal characteristics value is higher than '−100 dB', the UE may decrease the value of the revert counter by '1', and then, when the value of the revert counter reaches '10', the UE may revert the priority order to its original state.

Here, the case where the initial value of the revert counter is set to be '0' and when the value of the revert counter is increased by more than '10', the priority is reverted is taken as an example, but it may be also possible that the initial value of the revert counter is set to be a certain value and when the value of the revert counter is reduced to '0', the priority may be reverted. The initial value or certain value of the revert counter may be implicitly determined between the base station and the UE, or may be determined by one of the base station and the UE and informed to the other explicitly.

The time point at which the priority is reverted according to the revert information instructing reverting of the priority order to its original state may be explicitly instructed by the base station, or may be incidental as follows.

(1) Time point at which the signal characteristics of the serving cell deteriorates to below certain conditions,
(2) Time point at which the revert timer expires,
(3) Time point at which the both conditions (1) and (2) are met,
(4) Time point at which one of the conditions (1), (2), and (3) are maintained for a particular time period,
(5) Time point at which an event occurs by the revert counter,
(6) Time point at which the conditions (5) are maintained for a particular time period,
(7) Time point of cell reselection, time point at which a tracking area is changed, time point at which a registration area (a plurality of TAs) is changed, time point at which a PLMN is changed, or the like,
(8) Time point at which a particular RRC message (RRC connection reconfiguration failure message) is transmitted/received,
(9) Time point at which system information is received or time point at which particular information (e.g., NCL) of the system information is received, after cell selection or cell reselection.

The base station may transmit the priority change information, the priority change and revert instruction information, the information about the revert timer and the revert counter, or the like, to the UE in the following manner. Hereinbelow, those information are called priority control information.

(1) System information: Priority control information is transmitted through system information.

(2) Paging: Priority control information may be transmitted to the UE through a paging message. Namely, like a paging record including a paging cause and a UE identifier, priority control information is included in the paging message and transmitted to the UE. When the paging record is included in the paging message, the UE performs a general paging procedure according to the paging record information, and if there exists priority control information, the UE performs a corresponding operation. If the paging message includes both the paging record and the priority control information, whether to perform both operations or whether to perform only one of them according to each information may be defined by the system. The paging record may include the priority control information. If both the paging record and the priority control information exist, only a particular UE may perform an operation according to the priority control information according to a UE identifier included in the paging record.

(3) L1/L2 control channel: The priority control information may be transmitted via a channel that transfers control information such as a PDCCH. One example of a particular value indicating the priority control information may be an identity value according to whether or not a change is instructed and a change rule. As the identity value, an RNTI indicating whether or not a change is instructed, a particular changing method, or the like, such as a P-RNTI indicating the presence of a paging message, may be defined to be used. Accordingly, a plurality of RNTIs may be defined according to the priority control information.

(4) RRC signaling: The priority control information may be transmitted through RRC signals such as a radio bearer setup message, a radio bearer reconfiguration message, an RRC connection request/connection setup/connection release message, an RRC connection reconfiguration message, an RRC connection re-establishment message, and the like.

(5) NAS signaling: The priority control information may be transmitted via the NAS signal such as the message in the TAU process.

(6) The priority control information may be transmitted through PDUs such as the RLC, the MAC, the PDCP, or the like, and it can be transferred according to every signaling procedure of the base station and the UE.

Figure 10:
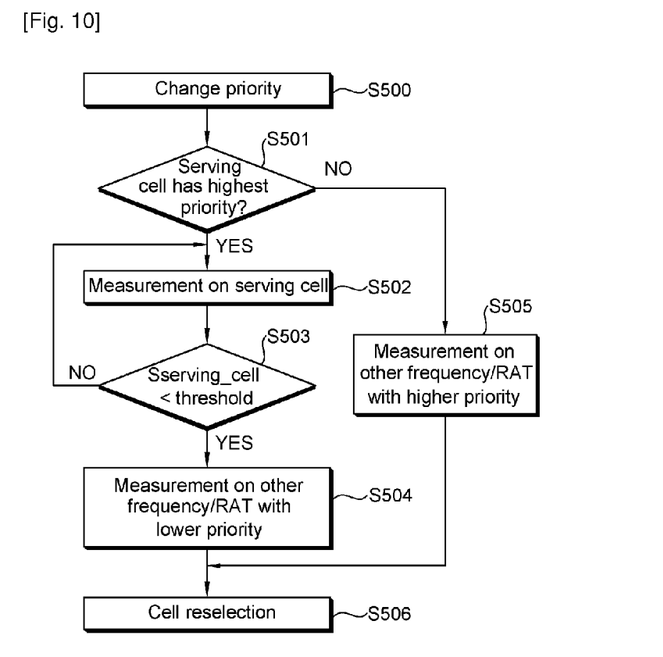
FIG. 10 is a flowchart illustrating the process of a cell measurement method according to another embodiment of the present invention.

FIG. 10 is a flowchart illustrating the process of a cell measurement method according to another embodiment of the present invention.

In step S500, the UE changes a previously set priority. For changing the priority, the UE may receive priority change information from the base station or may change the priority by the UE itself. In step S501, the UE determines whether the serving cell has the highest priority.

In step S502, if the serving cell has the highest priority, the UE measures a signal of the serving cell. In step S503, the UE checks whether the signal characteristics value of the serving cell ($S_{serving\_cell}$) satisfies certain conditions. The UE compares the signal characteristics value with a threshold, and if the signal characteristics value satisfies the threshold, the UE does not perform cell reselection, and after the lapse of a certain time, the UE measures again the signal of the serving cell. In step S504, if the signal characteristics value of the serving cell does not satisfy the certain conditions, the UE measures a signal for a cell of a frequency or RAT with lower priority. In step S506, the UE (or network) determines whether to perform cell reselection in consideration of the signal characteristics of the cell with the lower priority.

In step S505, if the priority of the serving cell is not the highest or if there is a cell with a priority higher than that of the serving cell, the UE measures the signal of the serving cell and a signal of the cell with the higher priority. In step S506, the UE (or network) determines whether to perform cell reselection in consideration of the signal characteristics value of the cell with the higher priority.

The UE may set priority according to priority change information to thereby not perform measurement on an unnecessary frequency or RAT, to thus reduce power consumption.

The example of changing priority is as follows. First, the base station allocates a first frequency with a first priority and a second frequency with a second priority to the UE through an RRC connection release message. Second, if the signal characteristics value of the serving cell drops to below a particular threshold (e.g., −100 dB), the UE performs measurement to select another cell. If the serving cell has the first frequency with the highest priority, the UE performs measurement on the serving cell at a particular period. If the serving cell has the second frequency, which does not have the highest priority, the UE measures cells with respect to both the first and second frequencies. Third, it is assumed that it is defined by system that the priority order can be changed without an explicit instruction from the base station and the UE uses the exchanging method to change priority. Then, when the UE selects the cell of the second frequency with the lower priority, the UE sets the priority of the selected cell as the highest priority, and sets the priority of the first frequency as the second priority.

When the UE selects the cell of the second frequency, if changing of the priority is not possible, although the signal characteristics value of the serving cell is high, the UE would perform measurement to find a cell with high priority periodically, only to waste power. In the present invention, however, because the priority can be changed, the priority of the second frequency can be higher than that of the first priority, and thus, the UE does not perform measurement on the cell of the first frequency, whereby power consumption otherwise generated due to a measurement process can be reduced.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of measuring a cell in a wireless communication system, the method comprising:
   receiving priority information for a plurality of frequencies or Radio Access Technologies (RATs);
   measuring a frequency or RAT of a serving cell determining its priority;
   measuring a different frequency or RAT with higher priority than a priority of the frequency or RAT of the serving cell when the priority of the frequency or RAT of the serving cell is not the highest priority;
   selecting the frequency or RAT of the serving cell based on the result of the measurement;
   configuring the priority of the frequency or RAT of the serving cell as the highest priority; and
   suspending the measurement of the different frequency or RAT with the higher priority when a measurement result of the frequency or RAT of the serving cell is higher than a reference value,
   wherein the frequency or RAT of the serving cell is configured as the highest priority when a measurement result of the different frequency or RAT with higher priority is lower than the reference value and a measurement result of the frequency or RAT of the serving cell is higher than a first threshold.

2. The method of claim 1, further comprising:
   starting a revert timer after the configuration; and
   returning the highest priority of the frequency or RAT of the serving cell to a priority indicated by the priority information when the revert timer expires.

3. The method of claim 1, further comprising:
   starting a counter after the configuration; and
   returning the highest priority of the frequency or RAT of the serving cell to a priority indicated by the priority information when the value of the counter exceeds a designated value.

4. A user equipment comprising:
   a Radio Frequency (RF) unit for receiving a radio signal; and
   a processor coupled with the RF unit and configured to:
      receive priority information for a plurality of frequencies or Radio Access Technologies (RATs);
      measure a frequency or RAT of a serving cell to detect its priority;

measure a different frequency or RAT with higher priority than the frequency or RAT of the serving cell when the priority of the frequency or RAT of the serving cell is not the highest priority;

select the frequency or RAT of the serving cell based on the result of the measurement;

configure the priority of the frequency or RAT of the serving cell as the highest priority; and suspend the measurement of the different frequency or RAT with the higher priority when a measurement result of the frequency or RAT of the serving cell is higher than a reference value, wherein the processor is further configured to configure the frequency or RAT of the serving cell as the highest priority when a measurement result of the different frequency or RAT with higher priority is lower than the reference value and a measurement result of the frequency or RAT of the serving cell is higher than a first threshold.

5. The user equipment of claim 4, wherein the processor is further configured to:

start a revert timer after the configuration; and return the highest priority of the frequency or RAT of the serving cell to a priority indicated by the priority information when the revert timer expires.

6. The user equipment of claim 4, wherein the processor is further configured to:

start a counter after the configuration; and return the highest priority of the frequency or RAT of the serving cell to a priority indicated by the priority information when the value of the counter exceeds a designated value.

* * * * *